United States Patent Office 3,385,855
Patented May 28, 1968

3,385,855
DIALKYL 1,2,3,4-TETRAHYDROPHENAZINE-1,4-DICARBOXYLATES
Hans R. Schweizer, Herrliberg, Switzerland, assignor, by mesne assignments, to Eastman Kodak Company, Rochester, N.Y., a corporation of New Jersey
No Drawing. Filed Mar. 25, 1965, Ser. No. 442,814
8 Claims. (Cl. 260—250)

ABSTRACT OF THE DISCLOSURE

Dialkyl - 1,2,3,4-tetrahydrophenazine-1,4-dicarboxylates are prepared by reacting a dialkyl-1,2-cyclohexanedione-3,6-dicarboxylate with an o-phenylenediamine. The compounds of the invention are useful as intermediates in the preparation of organic compounds such as polyesters and coloring agents.

This invention relates to a novel class of compounds. More particularly, this invention relates to dialkyl 1,2,3,4-tetrahydrophenazine-1,4-dicarboxylates.

It is known in the art that o-phenylene diamine will condense with a 1,2-diketone or an o-quinone to form polycyclic diazines. The present invention utilizes a similar reaction to prepare a new class of compounds.

It is an object of this invention to provide as new compositions of matter dialkyl 1,2,3,4-tetrahydrophenazine-1,4-dicarboxylates.

This and other objects are attained by the practice of this invention which, briefly, comprises providing a dialkyl 1,2,3,4 - tetrahydrophenazine having the general formula

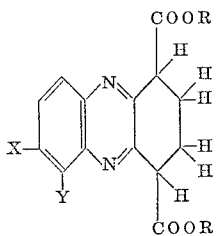

wherein each R is a (lower) alkyl group, X is a member selected from the group consisting of hydrogen, halogen, nitro, amino, (lower) alkyl, (lower) alkoxy, aryl, aryloxy and a part of a ring in which Y is also participating, Y is a member selected from the group consisting of hydrogen and a part of a ring in which X is also participating, and X and Y, taken together with the carbon atoms in the 6- and 7-positions on the phenazine nucleus form a member selected from the group consisting of five-membered and six-membered carbocyclic and heterocyclic rings.

As used herein, the term "(lower)" when used in conjunction with "alkyl" and "alkoxy" means both straight and branched chain aliphatic hydrocarbon radicals having from 1 to 6 carbon atoms.

The novel compounds of this invention may be prepared by reacting a dialkyl 1,2-cyclohexanedione-3,6-dicarboxylate having the general formula

COOR
|
CH
/  \
CH₂   C=O
|     |
CH₂   C=O
\  /
CH
|
COOR wherein R is the same as defined above with an o-phenylenediamine having the general formula

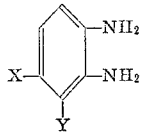

wherein X and Y are the same as described above. Examples of the R group in the above general formulas include methyl, ethyl, propyl or butyl groups. Representative of the X group in the above general formulas, other than the specific groups previously mentioned, are chloro, bromo, methyl, ethyl, propyl, butyl, methoxy, ethoxy, propoxy, butoxy, phenyl and phenoxy. The X and Y groups taken together may be, for example, a fused benzene ring.

The dialkyl 1,2 - cyclohexanedione - 3,6-dicarboxylates which are used as reactants in preparing the compounds of this invention may be prepared by reacting in the presence of two moles of a sodium alkylate one mole of a dialkyl oxalate having the formula

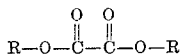

and one mole of a dialkyl adipate having the formula

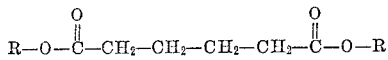

wherein each R is the same as described above. The sodium alkylate which is used as a cyclo-condensation catalyst should correspond to the alcohol portion of the ester—i.e., sodium ethylate is used with ethyl esters of oxalic and adipic acids. A slight excess of dialkyl oxalate and sodium alkylate may be employed. The dialkyl 1,2-cyclohexanedione-3,6-dicarboxylate is separated and isolated from the resulting mixture of condensation products by treating the latter with dilute aqueous alkali, whereby its insoluble alkali salt is formed. The following procedure is illustrative of the method of preparation of a dialkyl 1,2-cyclohexanedione-3,6-dicarboxylate:

Sodium ethylate (34.0 g.; 0.5 mole) was suspended in 200 ml. of dry diethyl ether. Diethyl oxalate (36.5 g.; 0.25 mole) was added with stirring. After 15 minutes, there was then added diethyl adipate (50.5 g.; 0.25 mole) and the mixture was refluxed for one hour with stirring. The ether was then removed by distillation and the residue was warmed to 120–130° C. resulting in the evolution of ethanol. The reaction mixture was held for four hours at 120–130° C. after which time the evolution of ethanol was complete. The mixture was then cooled and the brown reaction mass was carefully acidified by the addition of 330 ml. of 10% aqueous sulfuric acid. The resultant brown oil was extracted with a small amount of diethyl ether. The ether extract was treated with an equal volume of 2 N sodium hydroxide solution. The ether extract was then diluted with an equal volume of fresh ether and the aqueous alkaline portion was diluted with an equal volume of distilled water. Subsequently, the white salt which had precipitated was recovered by filtration. The salt was washed with a small amount of normal sodium hydroxide solution, then with some ether and dried as much as possible by suction. The wet salt was then treated with a small amount of dilute hydrochloric acid to convert it into the free diketone. The diketone was recrystallized from ethanol. The product, diethyl 1,2-cyclohexanedione-3,6-dicarboxylate (3.9 g.), was determined to have a melting point of 57–58° C. The compound analyzed as follows:

Calcd. for $C_{12}H_{16}O_6$: C, 56.24%; H, 6.29%. Found: C, 56.25%; H, 6.23%.

The infra-red absorption spectrum showed ketobands at 5.75, 5.85, 6.00 and 6.20 microns.

The o-phenylene diamines which are used as starting materials in the preparation of the compounds of this invention may be prepared by methods well known in the art. Many of these compounds are commercially available.

The dialkyl 1,2-cyclohexanedione-3,6-dicarboxylate may be reacted with the o-phenylene diamine in an inert reaction medium. The reaction may be hastened by heating and it is preferred to conduct the reaction by heating under reflux. The product, dialkyl 1,2,3,4-tetrahydrophenazine-1,4-dicarboxylate, forms as a precipitate from the cooled reaction mixture and may be collected by filtration. The product may be purified by recrystallization or by other techniques known to the art.

The novel dialkyl 1,2,3,4-tetrahydrophenazine-1,4-dicarboxylates of this invention are useful as intermediates in the preparation of organic compounds such as polyesters. For example, they may be condensed with a glycol, such as ethylene glycol, tetramethylene glycol, pentamethylene glycol, decamethylene glycol, 1,5-pentanediol, 2-methyl-1,5-pentanediol, etc., using a conventional ester interchange catalyst to prepare polyesters. They may also be used to modify the properties of conventional polyesters, such as polyethylene terephthalate, by being substituted for a portion of the conventional dicarboxylic component, such as dimethyl terephthalate, in the preparation of the polyester. The polyesters are useful for the production of films, fibers, molded objects, etc.

The dialkyl 1,2,3,4-tetrahydrophenazine-1,4-dicarboxylates are also useful intermediates in the preparation of other compounds. Thus, they may be dehydrogenated to form dialkyl 5,10-dihydrophenazine-1,4-dicarboxylates which themselves are useful as red colorants for plastics, lacquers, etc.

The following examples illustrate the best modes contemplated for carrying out this invention:

EXAMPLE 1

Diethyl 1,2-cyclohexanedione-3,6-dicarboxylate (12.8 g.; 0.05 mole) was suspended in a mixture of 60 ml. of ethanol and 5 ml. of acetic acid. The mixture was heated to reflux and sublimed o-phenylenediamine (5.4 g.; 0.05 mole) dissolved in 40 ml. of ethanol was added. Thereafter, the solution was refluxed for 1 hour. It was then cooled to 0° C. Diethyl 1,2,3,4-tetrahydrophenazine-1,4-dicarboxylate was recovered from the solution by filtration as an orange-yellow solid. It was determined to have a melting point of 96° to 97° C. The product (14.6 g.) was obtained in an 89.5% of theoretical yield. It was then recrystallized twice from ethanol. The recrystallized material had a melting point of 99° C. The compound had the following analysis:

Calcd. for $C_{18}H_{20}N_2O_4$: C, 65.84; H, 6.14; N, 8.53%. Found: C, 65.83; H, 6.20; N, 8.61%.

EXAMPLE 2

Diethyl 1,2-cyclohexanedione-3,6-dicarboxylate (2.5 g.; 0.01 mole) was suspended in a mixture of 30 ml. of ethanol and 2 ml. of acetic acid. The solution was warmed to 60° C. and a solution of sublimed, pure 3,4-diaminotoluene (1.2 g.; 0.01 mole) in 35 ml. of ethanol was added with stirring over a period of 30 minutes. Thereafter, the solution was refluxed for 30 minutes. The entire operation was carried out under an atmosphere of nitrogen. The mixture was then cooled to −10° C. A precipitate of long orange needles resulted which was recovered by filtration. The product, diethyl 7-methyl-1,2,3,4-tetrahydrophenazine-1,4-dicarboxylate (1.45 g.) was determined to have a melting point of 92° C. After recrystallization from methanol, the melting point of the product was determined to be 94° C. The compound had the following analysis:

Calcd. for $C_{19}H_{22}O_4N_2$: C, 66.65; H, 6.48; N, 8.18%. Found: 66.57; H, 6.64; N, 8.18%.

EXAMPLE 3

Diethyl 1,2-cyclohexanedione-3,6-dicarboxylate (5.1 g.; 0.02 mole) was suspended in 100 ml. of ethanol and two ml. of acetic acid were added. The solution was then warmed to 60° C. and 1,2-diaminonaphthalene (3.4 g.; 0.02 mole) in 100 ml. of hot ethanol was added with stirring. The solution was refluxed overnight and then concentrated by evaporation. All of these operations were conducted under an atmosphere of nitrogen. After cooling, 4.5 g. of diethyl 6,7-benzo-1,2,3,4-tetrahydrophenazine-1,4-dicarboxylate having a melting point of 106 to 108° C. were obtained. Recrystallization of this product from high boiling ligroin raised the melting point to 119–120° C. The recrystallized product had a reddish color. The compound had the following analysis:

Calcd. for $C_{22}H_{22}N_2O_4$: C, 69.82; H, 5.86; N, 7.40%. Found: C, 70.06; H, 6.04; N, 7.89%.

EXAMPLE 4

Diethyl 1,2-cyclohexanedione-3,6-dicarboxylate (5.12 g.; 0.02 mole) was suspended in 30 ml. of ethanol and 2.5 ml. acetic acid. A suspension of sublimed 4-nitro-1,2-phenylenediamine (3.1 g.; 0.02 mole) in a mixture of 90 ml. of ethanol and 10 ml. of acetic acid was added over a period of about 30 minutes. The mixture was then boiled for 3½ hours resulting in a clear solution. The solution was cooled to 0° C. whereupon a crystalline precipitate was formed. The precipitate was recovered by filtration and washed with cold ethanol. The product, diethyl 7 - nitro-1,2,3,4-tetrahydrophenazine-1,4-dicarboxylate (5.8 g.) was of an orange-yellow color and was determined to have a melting point of 149 to 150° C. The product was recrystallized from propanol and the recrystallized product was found to have a melting point of 153° C. The compound had the following analysis:

Calcd. for $C_{18}H_{19}N_3O_6$: C, 57.90; H, 5.13; N, 11.26%. Found: C, 57.86; H, 5.20; N, 11.16%.

Other dialkyl 1,2,3,4 - tetrahydrophenazine-1,4-dicarboxylates can be prepared by the processes of the foregoing examples and the preceding general description. Thus, when the processes of Examples 1 to 4 are repeated substituting dimethyl 1,2-cyclohexanedione-3,6-dicarboxylate for the diethyl 1,2-cyclohexanedione-3,6-dicarboxylate,
dimethyl 1,2,3,4-tetrahydrophenazine-1,4-dicarboxylate,
dimethyl 7-methyl-1,2,3,4-tetrahydrophenazine-1,4-dicarboxylate,
dimethyl 6,7-benzo-1,2,3,4-tetrahydrophenazine-1,4-dicarboxylate, and
dimethyl 7-nitro-1,2,3,4-tetrahydrophenazine-1,4-dicarboxylate, respectively, are obtained. When the processes of Examples 1 to 4 are repeated substituting dipropyl 1,2-cyclohexanedione-3,6-dicarboxylate for the diethyl 1,2-cyclohexanedione-3,6-dicarboxylate,
dipropyl 1,2,3,4-tetrahydrophenazine-1,4-dicarboxylate,
dipropyl 7-methyl-1,2,3,4-tetrahydrophenazine-1,4-dicarboxylate,
dipropyl 6,7-benzo-1,2,3,4-tetrahydrophenazine-1,4-dicarboxylate, and
dipropyl 7-nitro-1,2,3,4-tetrahydrophenazine-1,4-dicarboxylate, respectively, are obtained. Similarly, when the processes of Examples 1 to 4 are repeated substituting dibutyl 1,2-cyclohexanedione-3,6-dicarboxylate for the diethyl 1,2-cyclohexanedione-3,6-dicarboxylate,
dibutyl 1,2,3,4-tetrahydrophenazine-1,4-dicarboxylate,
dibutyl 7-methyl-1,2,3,4-tetrahydrophenazine-1,4-dicarboxylate, dibutyl 6,7-benzo-1,2,3,4-tetrahydrophenazine-1,4-dicarboxylate, and
dibutyl 7-nitro-1,2,3,4-tetrahydrophenazine-1,4-dicarboxylate, respectively, are obtained. Also, when the processes of Examples 1 to 4 are repeated substituting dihexyl 1,2-cyclohexanedione-3,6-dicarboxylate for the diethyl 1,2-cyclohexanedione-3,6-dicarboxylate,
dihexyl 1,2,3,4-tetrahydrophenazine-1,4-dicarboxylate,
dihexyl 7-methyl-1,2,3,4-tetrahydrophenazine-1,4-dicarboxylate,
dihexyl 6,7-benzo-1,2,3,4-tetrahydrophenazine-1,4-dicarboxylate and
dihexyl 7-nitro-1,2,3,4-tetrahydrophenazine-1,4-dicarboxylate, respectively, are obtained.

Other compounds that can be prepared are, for example, diisopropyl 1,2,3,4-tetrahydrophenazine-1,4-dicarboxylate,
diisobutyl 1,2,3,4-tetrahydrophenazine-1,4-dicarboxylate,
diethyl 7-bromo-1,2,3,4-tetrahydrophenazine-1,4-dicarboxylate,
diethyl 7-chloro-1,2,3,4-tetrahydrophenazine-1,4-dicarboxylate,
diethyl 7-ethyl-1,2,3,4-tetrahydrophenazine-1,4-dicarboxylate,
diethyl 7-methoxy-1,2,3,4-tetrahydrophenazine-1,4-dicarboxylate,
diethyl 7-ethoxy-1,2,3,4-tetrahydrophenazine-1,4-dicarboxylate,
diethyl 7-phenyl-1,2,3,4-tetrahydrophenazine-1,4-dicarboxylate,
diethyl 7-o-methoxyphenyl-1,2,3,4-tetrahydrophenazine-1,4-dicarboxylate,
diethyl 7-p-methoxyphenyl-1,2,3,4-tetrahydrophenazine-1,4-dicarboxylate,
diethyl 7-p-methylphenyl-1,2,3,4-tetrahydrophenazine-1,4-dicarboxylate,
diamyl 1,2,3,4-tetrahydrophenazine-1,4-dicarboxylate,
diamyl 7-methyl-1,2,3,4-tetrahydrophenazine-1,4-dicarboxylate,
diamyl 6,7-benzo-1,2,3,4-tetrahydrophenazine-1,4-dicarboxylate, and
diamyl 7-nitro-1,2,3,4-tetrahydrophenazine-1,4-dicarboxylate.

Although the invention has been described in considerable detail with particular reference to certain preferred embodiments thereof, variations and modifications can be effected within the spirit and scope of the invention as described hereinbefore, and as defined in the appended claims.

I claim:
1. A compound which is a dialkyl 1,2,3,4-tetrahydrophenazine-1,4-dicarboxylate of the general formula

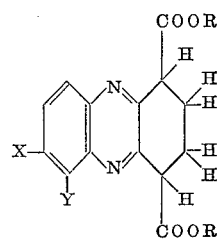

wherein each R is a lower alkyl group, X is a member selected from the group consisting of hydrogen, halogen, nitro, amino, lower alkyl, lower alkoxy, phenyl and phenoxy and Y is hydrogen or when taken together with X and the carbon atoms in the 6 and 7 positions on the phenazine nucleus form a fused benzene ring.

2. A composition as defined in claim 1 wherein each R group is methyl.
3. A composition as defined in claim 1 wherein each R group is ethyl.
4. A composition as defined in claim 1 wherein each R group is propyl.
5. Diethyl 1,2,3,4 - tetrahydrophenazine - 1,4-dicarboxylate.
6. Diethyl 7 - methyl - 1,2,3,4-tetrahydrophenazine-1,4-dicarboxylate.
7. Diethyl 6,7-benzo-1,2,3,4-tetrahydrophenazine - 1,4-dicarboxylate.
8. Diethyl 7 - nitro - 1,2,3,4 - tetrahydrophenazine-1,4-dicarboxylate.

No references cited.

NICHOLAS S. RIZZO, *Primary Examiner.*

F. A. MIKA, *Assistant Examiner.*